N. ATHANASSIOU.
SHOCK ABSORBER.
APPLICATION FILED SEPT. 27, 1920. RENEWED MAR. 3, 1922.
1,413,373.
Patented Apr. 18, 1922.
2 SHEETS—SHEET 1.
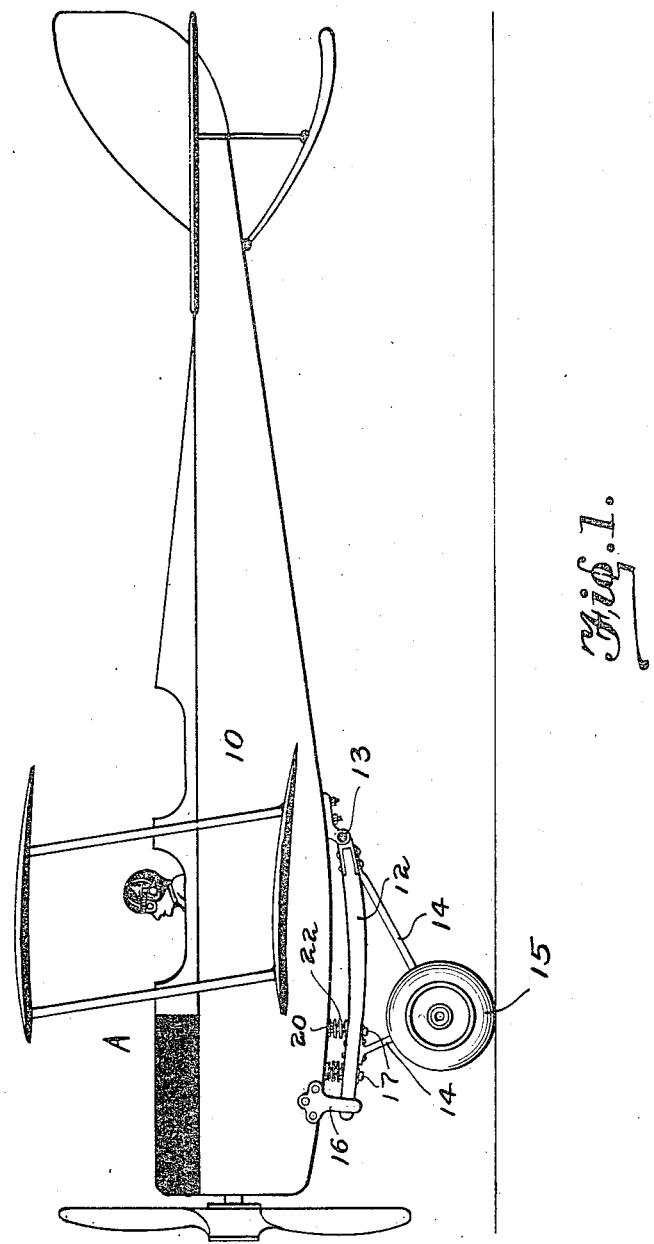

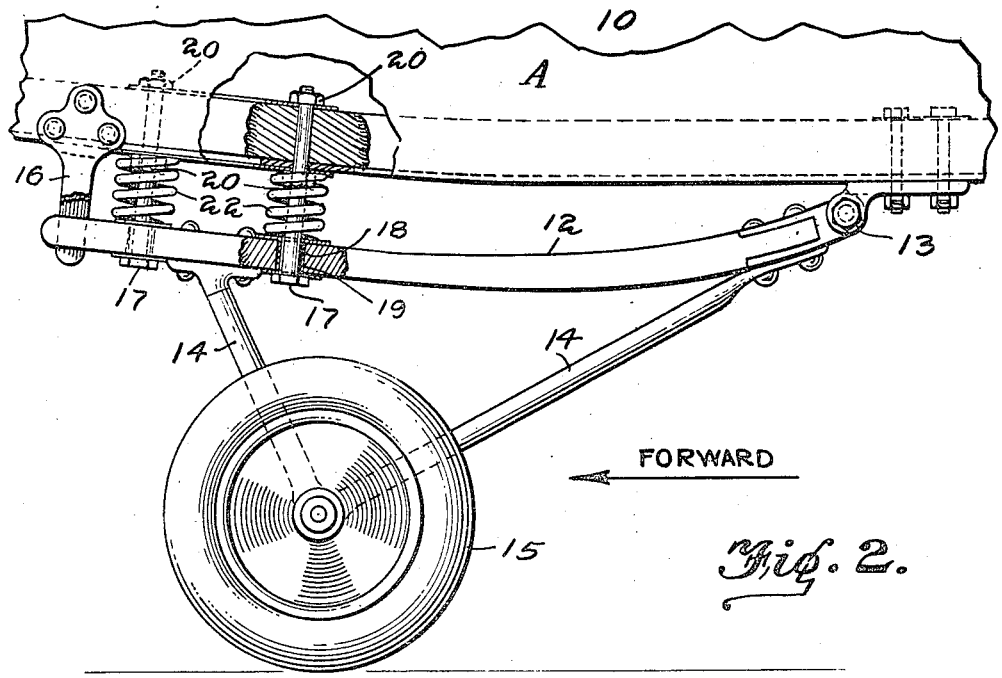
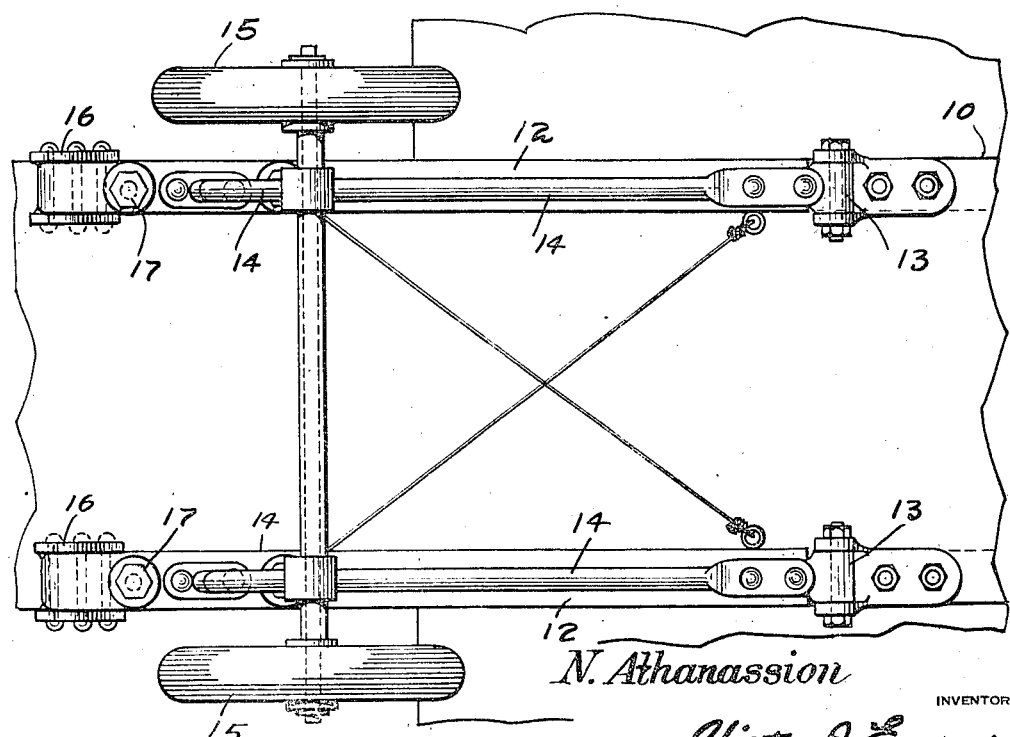

UNITED STATES PATENT OFFICE.

NICHOLAS ATHANASSIOU, OF TARPON SPRINGS, FLORIDA.

SHOCK ABSORBER.

1,413,373.  Specification of Letters Patent.  Patented Apr. 18, 1922.

Application filed September 27, 1920, Serial No. 412,951. Renewed March 3, 1922. Serial No. 540,936.

*To all whom it may concern:*

Be it known that I, NICHOLAS ATHANASSIOU, citizen of the United States, residing at Tarpon Springs, in the county of Pinellas and State of Florida, have invented new and useful Improvements in Shock Absorbers, of which the following is a specification.

This invention relates to aeroplanes, and comprehends the provision of an attachment therefor in the nature of a shock absorber, the construction of the attachment being such that it can be readily applied to any make of machine and operates to absorb the shock and jars incident to landing.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is an enlarged side elevation of an aero-plane equipped with the shock absorber forming the subject matter of the invention.

Figure 2 is a fragmentary side elevation showing the parts in section.

Figure 3 is a fragmentary bottom plan view.

Referring to the drawings in detail, A indicates generally an aero-plane wherein 10 represent the fuselage, and the means in which the attachment forming the subject matter of my invention is arranged.

The attachment embodies a member 12 which may be made of wood or any other suitable material arranged parallel to the underside of the fuselage and hinged as at 13 adjacent the rear end of the fuselage. The struts 14 upon which the ground wheel 15 is journaled, are secured to the member 12. The member 12 may vary in length and width, the forward extremity of the member being received between the parallel limbs of the substantially U-shaped guiding element 16 secured to the fuselage. The member 11 is supported in parallelism with the bottom of the fuselage by means of a plurality of headed bolts 17 which are passed through sleeves 18 fitted in openings 19 in the length of the member 12. These bolts are secured to the fuselage 10 by means of nuts 20, there being two nuts for each bolt which nuts are arranged above and below the fuselage for proper connection between the parts. Interposed between the hinged member 12 and the bottom of the fuselage are a plurality of coiled springs 22, there being one of these springs for each of the bolts above mentioned, the disposition of the springs being such that when the machine lands upon the ground or surface the shock and jar incident to such landing is absorbed by the springs and hinged member 12 without transmitting the same to the fuselage of the machine. Manifestly the construction of the attachment is very simple and can be used in conjunction with most any make of aeroplane or similar machine.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim is:

The combination with an aeroplane, including the struts and ground wheels, of a shock absorber consisting of spaced parallel members having their corresponding ends hingedly secured to the fuselage, said parallel members supporting said struts, a pair of spaced rods depending from the fuselage above each of the parallel members, each of said members having spaced bores receiving said rods whereby said members are slidable on said rods, a bushing arranged in each of said bores, coiled springs surrounding said rods and interposed between the fuselage and said parallel members, a guide for each of said parallel members, said guide comprising spaced parallel limbs depending from the fuselage and arranged to receive the adjacent end of said member, a cross piece connecting said limbs and spaced parallel attaching flanges arranged above said cross piece and adapted to be secured to the fuselage.

In testimony whereof I affix my signature.

- NICHOLAS ATHANASSIOU.